United States Patent
Choi et al.

(10) Patent No.: US 10,746,591 B2
(45) Date of Patent: Aug. 18, 2020

(54) MAGNETIC FIELD COMMUNICATION SYSTEM AND METHOD FOR MEASURING FLUTTER OF TURBINE BLADE

(71) Applicant: Doosan Heavy Industries & Construction Co., LTD, Changwon-si, Gyeongsangnam-do (KR)

(72) Inventors: Jong Min Choi, Yongin-si (KR); Hyun Woo Son, Yongin-si (KR)

(73) Assignee: Doosan Heavy Industries & Construction Co., LTD, Gyeongsangnam-do (KR)

(*) Notice: Subject to any disclaimer, the term of this patent is extended or adjusted under 35 U.S.C. 154(b) by 340 days.

(21) Appl. No.: 15/942,202

(22) Filed: Mar. 30, 2018

(65) Prior Publication Data
US 2018/0283936 A1 Oct. 4, 2018

(30) Foreign Application Priority Data
Apr. 4, 2017 (KR) .......................... 10-2017-043772

(51) Int. Cl.
*G01H 9/00* (2006.01)
*F01D 21/00* (2006.01)
(Continued)

(52) U.S. Cl.
CPC .......... *G01H 9/004* (2013.01); *F01D 21/003* (2013.01); *G01B 11/18* (2013.01); *H04B 5/0031* (2013.01);
(Continued)

(58) Field of Classification Search
CPC .. H04B 5/0031; H04B 5/0037; H04B 5/0043; H04B 5/0075–0093
See application file for complete search history.

(56) References Cited

U.S. PATENT DOCUMENTS

| 8,511,177 B1* | 8/2013 | Makaremi | G01M 5/0033 73/847 |
| 8,545,179 B2* | 10/2013 | Volanthen | G01D 5/35303 416/146 R |

(Continued)

FOREIGN PATENT DOCUMENTS

| DE | 102014117914 A1 * | 6/2016 | ............. F03D 17/00 |
| DE | 102014117914 A | 9/2016 | |

(Continued)

OTHER PUBLICATIONS

European Search Report Application 18165652.1.
2018-044797 Office Action.
2018-044797 Office Action (Machine Translation).

*Primary Examiner* — David L Singer
(74) *Attorney, Agent, or Firm* — Foundation Law Group, LLP; Kwang Jun Kim; J D Harriman

(57) ABSTRACT

The magnetic field communication system for measuring the flutter of the turbine blade includes a sensor module placed on an outer surface of the turbine blade to sense a signal on the flutter of the turbine blade; an interface converting the signal on the flutter sensed by the sensor module into a magnet field signal to transmit it to the outside of a casing surrounding the turbine blade; and an adaptor receiving the magnetic field signal to generate a power source of the system, and analyzing the magnetic field signal to determine the degree of the flutter of the turbine blade.

12 Claims, 7 Drawing Sheets

(51) Int. Cl.
  *G01B 11/16*  (2006.01)
  *H04B 5/00*  (2006.01)
  *H04L 29/08*  (2006.01)
  *H04B 10/25*  (2013.01)

(52) U.S. Cl.
  CPC ......... *H04B 5/0037* (2013.01); *H04B 5/0075* (2013.01); *F05B 2270/334* (2013.01); *F05B 2270/804* (2013.01); *F05D 2220/30* (2013.01); *F05D 2260/80* (2013.01); *F05D 2260/83* (2013.01); *F05D 2260/96* (2013.01); *F05D 2270/804* (2013.01); *G01B 2210/58* (2013.01); *H04B 10/2504* (2013.01); *H04L 67/12* (2013.01)

(56) References Cited

U.S. PATENT DOCUMENTS

| | | | |
|---|---|---|---|
| 8,757,003 | B1 | 6/2014 | Makaremi |
| 9,255,886 | B2 * | 2/2016 | Glavind ............ G01N 21/6447 |
| 2007/0098551 | A1 * | 5/2007 | Viertl ..................... F03D 17/00 |
| | | | 416/61 |
| 2008/0159674 | A1 | 7/2008 | Varonis |
| 2009/0116000 | A1 | 5/2009 | Kiddy et al. |
| 2009/0121896 | A1 * | 5/2009 | Mitchell ................. H04Q 9/00 |
| | | | 340/870.31 |
| 2010/0221111 | A1 * | 9/2010 | Nieuwenhuizen ...... F03D 80/00 |
| | | | 416/61 |
| 2010/0232963 | A1 * | 9/2010 | Volanthen ............ G01M 11/083 |
| | | | 416/146 R |
| 2011/0083028 | A1 * | 4/2011 | Jung ....................... H02J 9/005 |
| | | | 713/323 |
| 2011/0133949 | A1 * | 6/2011 | Subramanian ........... H04Q 9/00 |
| | | | 340/870.28 |
| 2011/0133950 | A1 * | 6/2011 | Subramanian ......... G01K 1/024 |
| | | | 340/870.28 |
| 2011/0211200 | A1 * | 9/2011 | Cribbs .................... G01L 1/242 |
| | | | 356/614 |
| 2011/0268571 | A1 * | 11/2011 | Menke ..................... H04Q 9/00 |
| | | | 416/61 |
| 2012/0053851 | A1 * | 3/2012 | Baller .................. F03D 7/0296 |
| | | | 702/34 |
| 2012/0056497 | A1 * | 3/2012 | Suzuki ..................... H02J 50/80 |
| | | | 307/149 |
| 2012/0068003 | A1 | 3/2012 | Bajekal et al. |
| 2012/0116598 | A1 * | 5/2012 | Olesen ................. G01M 5/0091 |
| | | | 700/287 |
| 2012/0161446 | A1 * | 6/2012 | McNeill ................. F03D 17/00 |
| | | | 290/55 |
| 2013/0110414 | A1 * | 5/2013 | Caponetti ............ F03D 7/0224 |
| | | | 702/35 |
| 2013/0243594 | A1 * | 9/2013 | Skovby ................... F01D 25/00 |
| | | | 416/1 |
| 2013/0255398 | A1 * | 10/2013 | Philipsen ............. G01M 5/0091 |
| | | | 73/800 |
| 2013/0280070 | A1 * | 10/2013 | Lindby ................... F03D 17/00 |
| | | | 416/61 |
| 2013/0342360 | A1 * | 12/2013 | Bevly, III ............... H01F 38/14 |
| | | | 340/870.07 |
| 2014/0054894 | A1 * | 2/2014 | Olesen .................... G01N 21/55 |
| | | | 290/44 |
| 2015/0098819 | A1 | 4/2015 | Snecma |
| 2015/0354402 | A1 * | 12/2015 | Ehsani ................... F01D 21/003 |
| | | | 290/44 |
| 2016/0169939 | A1 * | 6/2016 | Tokgoz ................... H04B 5/0068 |
| | | | 324/601 |
| 2016/0245262 | A1 * | 8/2016 | Ide ........................ G01M 11/085 |
| 2016/0319845 | A1 * | 11/2016 | Molnar ................... F04D 25/066 |
| 2016/0370256 | A1 * | 12/2016 | Zacchio ................ H04L 12/40045 |
| 2016/0373837 | A1 * | 12/2016 | Sobanski ................... F02K 3/06 |
| 2017/0268486 | A1 * | 9/2017 | Muller .................... F03D 7/042 |
| 2018/0156200 | A1 * | 6/2018 | Caponetti ............... F03D 17/00 |
| 2018/0224353 | A1 * | 8/2018 | Gysling .................. G01M 5/0066 |

FOREIGN PATENT DOCUMENTS

| | | |
|---|---|---|
| JP | 2015518535 A | 7/2015 |
| KR | 10-2013-0078263 A | 7/2013 |
| WO | WO-2017065413 A1 * | 4/2017 ............. H02J 50/12 |

* cited by examiner

MAGNETIC FIELD COMMUNICATION SYSTEM AND METHOD FOR MEASURING FLUTTER OF TURBINE BLADE

CROSS-REFERENCE TO RELATED APPLICATIONS

This application claims priority to Korean Patent Application No. 10-2017-0043772, filed on Apr. 4, 2017, the disclosure of which is incorporated herein by reference in its entirety.

BACKGROUND OF THE DISCLOSURE

Field of the Disclosure

The present disclosure relates to a magnetic field communication system and a method for measuring flutter of a turbine blade, and more particularly, to a magnetic field communication system and a method for measuring flutter of a turbine blade that communicates a signal sensing the state of the turbine blade using a magnetic field, and converting a magnetic field signal into a power source to analyze the state of the turbine blade.

Description of the Related Art

If a rotation speed of a turbine increases when the turbine operates, the phenomenon that the turbine blade is bent or twisted by air pressure is caused. The phenomenon is defined as flutter. The flutter causes a decrease in the output of an engine. Accordingly, a system and a method capable of reducing damage of the turbine by sensing the flutter are required.

Now, in order to measure the flutter of the turbine blade, there is a method of assuming the state of the turbine blade by sensing the vibration of the turbine blade, and the method has the problem in that an error may be caused depending upon the location of the turbine blade where the vibration is sensed. Furthermore, in order to constantly sense the state of turbine blade, it is inconvenient to periodically replace a battery of a sensor module.

RELATED ART DOCUMENT

Patent Document (Patent Document 1) Korean Patent Laid-Open Publication No. 10-2015-0060937 (Title: MEASUREMENT METHOD FOR DETECTING DAMAGE TO A TURBINE BLADE AND TURBINE, Published Date: May 8, 2014).

SUMMARY OF THE DISCLOSURE

The present disclosure is proposed for resolving the above problem, and the object of the present disclosure is to provide a magnetic field communication system and a method capable of measuring flutter of a turbine blade placed inside a casing of a turbine.

Furthermore, the object of the present disclosure is to provide the magnetic field communication system and the method for measuring the flutter of the turbine blade capable of measuring the flutter of the turbine blade without replacing the battery of the sensor module by voluntarily generating a power source using a magnetic field.

Other than the objects of the present disclosure described above, it is obvious to those skilled in the art to which the present disclosure pertains that other features and advantages of the present disclosure will be described hereinafter, or can be understood from such a technology and description.

A magnetic field communication system for measuring flutter of a turbine blade in accordance with an embodiment of the present disclosure for achieving the objects described above includes a sensor module placed on an outer surface of the turbine blade to sense a signal on the flutter of the turbine blade; an interface converting the signal on the flutter sensed by the sensor module into a magnetic field signal to transmit it to the outside of a casing surrounding the turbine blade, and an adaptor receiving the magnetic field signal to generate a power source of the system, and analyzing the magnetic field signal to determine the degree of the flutter of the turbine blade.

Furthermore, the sensor module includes an optical fiber placed on the outer surface of the turbine blade; and at least one sensor.

Furthermore, the optical fiber contacts along the blade direction of the turbine blade, the sensor is provided to the point where one end and the other end of the optical fiber meet, and the sensor senses the change of the wavelength of a signal and the time when the signal transmitted from the sensor again reaches the sensor by the optical fiber by transmitting the signal in one direction of the optical fiber and receiving the transmitted signal.

Furthermore, the sensor is provided in plural along the blade direction of the turbine blade, and the sensors measure the flutter for each section of the outer surface of the turbine blade.

Furthermore, the optical fiber is provided along the length direction in which the turbine blade is extended from a turbine rotor, and the sensor is provided in plural to one end and the other end of the optical fiber, respectively.

Furthermore, the sensors include a first sensor provided to one end of the optical fiber, and a second sensor provided to the other end of the optical fiber, and the second sensor receives the signal transmitted by the first sensor to measure the change of the wavelength of the signal and the reach time of the signal.

Furthermore, the interface is placed on the outer surface of the turbine blade.

Furthermore, the adaptor includes a magnetic field reception unit receiving the magnetic field signal; a control unit analyzing the magnetic field signal to measure the flutter of the turbine blade; and a power source unit generating a power source using the magnetic field signal, and storing the power source.

Furthermore, if the power source unit is not charged, the control unit uses the magnetic field signal to supply it to the power source unit to generate the power source.

Furthermore, if the capacity of the power source charged in the power source unit is equal to or greater than a first capacity, the control unit uses the magnetic field signal to measure the flutter of the turbine blade, the first capacity being the capacity that the charging of the power source unit is completed.

Furthermore, if the capacity of the power source stored in the power source unit after the charging of the power source unit is completed is reduced to be equal to or smaller than a second capacity, the control unit uses the received magnetic field signal to charge the power source unit.

Furthermore, the control unit analyzes the wavelength of the signal on the flutter measured by the sensor module by analyzing the magnetic field signal to compare it with a pre-stored wavelength.

Furthermore, as a result of comparing the wavelength of the signal on the flutter with the pre-stored wavelength, the control unit determines the flutter of the turbine blade in the normal range within an error range, and as a result of comparing the wavelength of the signal on the flutter with the pre-stored wavelength, determines the flutter of the turbine blade in the abnormal range if the error range is exceeded.

Furthermore, the control unit analyzes a transmission/reception time of the signal on the flutter measured by the sensor module by analyzing the magnetic field signal to compare it with a pre-stored transmission/reception time.

Furthermore, as a result of comparing the transmission/reception time of the signal on the flutter with the pre-stored transmission/reception time, the control unit determines the flutter range of the turbine blade in the normal range within an error range, and as a result of comparing the transmission/reception time of the signal on the flutter with the pre-stored transmission/reception time, determines the flutter range of the turbine blade in the abnormal range if the error range is exceeded.

Furthermore, the present disclosure includes a sensor module, which is placed on an outer surface of a turbine blade, sensing the wavelength and the transmission/reception time of a signal on the flutter of the turbine blade; converting the sensed wavelength and the sensed transmission/reception time into a magnetic field signal to transmit it to the outside of a casing surrounding the turbine blade; and analyzing the magnetic field signal, which is received by the adaptor to generate a power source of the system, to determine the flutter of the turbine blade.

Furthermore, the sensor module includes an optical fiber placed on the outer surface of the turbine blade and at least one sensor, and the adaptor includes a magnetic field reception unit receiving the magnetic field signal; a control unit analyzing the magnetic field signal to measure the flutter of the turbine blade; and a power source unit generating the power source using the magnetic field signal and storing the power source.

Furthermore, the determining of the flutter of the turbine blade includes the power source unit generating the power source using the magnetic field signal, and the control unit analyzing the received magnetic field signal to determine the flutter of the turbine blade if the power source unit is charged to be equal to or greater than a first capacity, the first capacity being the capacity that the charging of the power source unit is completed.

Furthermore, in the determining of the flutter of the turbine blade, the control unit uses the received magnetic field signal until the capacity of the power source charged in the power source unit becomes equal to or greater than the first capacity to generate the power source.

Furthermore, in the determining of the flutter of the turbine blade, if the capacity of the power source stored in the power source unit that is equal to or greater than the first capacity is reduced to be equal to or smaller than a second capacity, the control unit further includes supplying the magnetic field signal to the power source unit so that the capacity of the power source of the power source unit again becomes equal to or greater than the first capacity.

The magnetic field communication system for measuring the flutter of the turbine blade in accordance with an embodiment of the present disclosure can reduce damage of the turbine by measuring the flutter of the turbine blade placed inside the casing of the turbine. Furthermore, it is possible to transmit/receive the magnetic field to voluntarily generate the power source, thus measuring the flutter of the turbine blade without replacing the battery of the sensor module, and simplifying the configuration of the communication system because a separate battery is not required.

Other than the above, other features and advantages of the present disclosure can be newly identified through embodiments of the present disclosure.

DESCRIPTION OF SPECIFIC EMBODIMENTS

Figure 1:
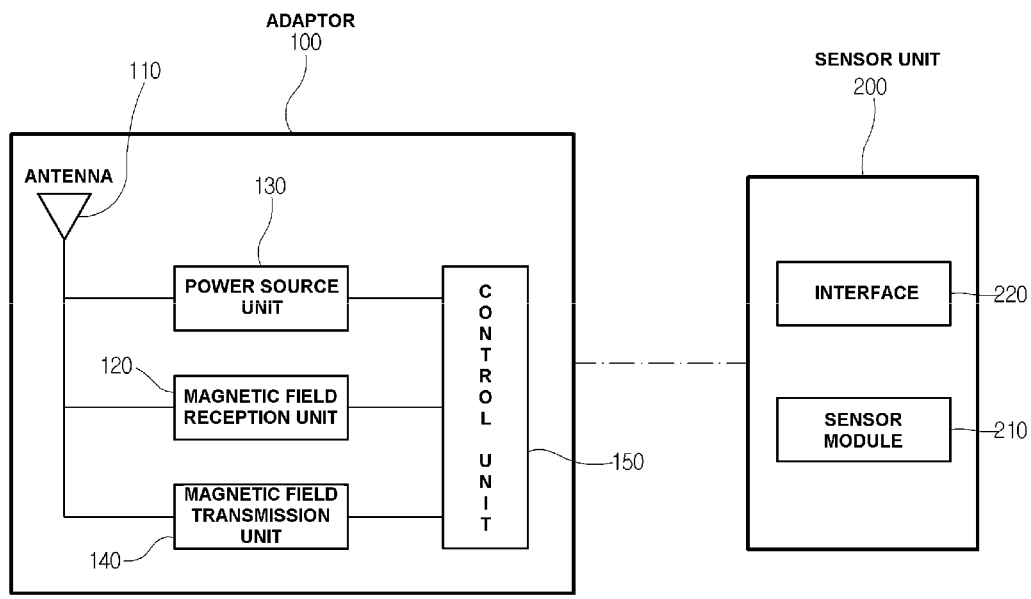
FIG. 1 is a view schematically illustrating a magnetic field communication system for measuring flutter of a turbine blade in accordance with an embodiment of the present disclosure.

Hereinafter, exemplary embodiments of the present disclosure will be described in detail with reference to the accompanying drawings so that those skilled in the art to which the present disclosure pertains may easily practice the present disclosure. The present disclosure may be implemented in various different forms, and is not limited to the exemplary embodiments described herein.

Descriptions of irrelevant components are omitted so as to clearly describe the exemplary embodiments of the present disclosure, and throughout this specification, the same or like elements are denoted by the same reference numerals.

Throughout this specification, it will be understood that when an element is referred to as being "connected" to another element, it can be "directly connected" to the other element or "electrically connected" to the other element with other elements interposed therebetween. It will be further understood that when an element is referred to as "comprises" another element, the element is intended not to exclude one or more other elements, but to further include one or more other elements, unless the context clearly indicates otherwise.

When it is described that any one part is "on" the other part, it may mean that the part is directly on the other part or any other part is interposed therebetween. On the contrary, when it is described that any one part is "directly on" the other part, there is no other part interposed therebetween.

The terminology used herein is for the purpose of describing particular embodiments only and is not intended to limit the present disclosure. The singular forms used herein are intended to include the plural forms as well, unless the context clearly indicates otherwise. It will be further understood that the terms "comprises" and/or "comprising," or "includes" and/or "including" used in this specification, specify the presence of stated features, regions, integers, steps, operations, elements, and/or components, but do not preclude the presence or addition of other features, regions, integers, steps, operations, elements, and/or components.

Terms "below", "above", and the like indicating a relative space may be used to more easily describe a relationship between one part illustrated in the drawings with another pan. These terms are intended to include other meanings or operations of a device that is being used, in addition to meanings intended in the drawings. For example, when the device in the drawing is inverted, any parts described as being "below" other parts may be described as being "above" the other parts. Therefore, the exemplary term "below" includes both of an upper direction and a lower direction. The device may rotate by 90° or other angles, and the terms indicating a relative space are interpreted according thereto.

Unless otherwise defined, all terms (including technical and scientific terms) used herein have the same meaning as commonly understood by one of ordinary skill in the art to which the present disclosure pertains. The terms defined in commonly used dictionaries, should be additionally interpreted as having a meaning that is consistent with the context of the relevant art and the present disclosure, and will not be interpreted in an idealized or overly formal sense unless expressly so defined herein.

Figure 2:
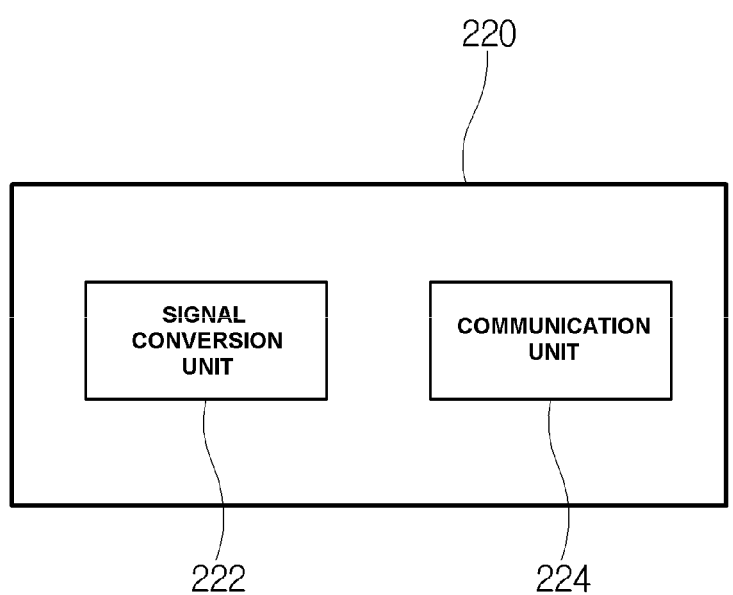
FIG. 2 is a view schematically illustrating the configuration of an interface in accordance with an embodiment of the present disclosure.

FIG. 1 is a view schematically illustrating a magnetic field communication system for measuring flutter of a turbine blade in accordance with an embodiment of the present disclosure, and FIG. 2 is a view schematically illustrating the configuration of an interface in accordance with an embodiment of the present disclosure.

Referring to FIGS. 1 and 2, a magnetic field communication system for measuring flutter of a turbine blade in accordance with an embodiment of the present disclosure can include a sensor unit 200 and an adaptor 100.

The sensor unit 200 can include a sensor module 210 and an interface 220. The sensor module 210 can be placed on an outer surface of the turbine blade, and include an optical fiber placed on the outer surface of the turbine blade and at least one sensor. The detailed description of the sensor module 210 will be described later.

The interface 220 can be placed on the outer surface of the turbine blade to receive the wavelength of a signal on the flutter of the turbine blade sensed by the sensor module 210 and the transmission/reception time of the signal. The interface 220 can transmit information including the wavelength of the signal on the flutter of the turbine blade and the transmission/reception time of the signal on the flutter of the turbine blade, which are received, to the outside of a casing surrounding the turbine blade. As one example, the interface 220 can be placed on the outer surface of the turbine blade as a separate configuration from the sensor module 210. As another example, the interface 220 can be one configuration of the sensor module 210.

The interface 220 can include a signal conversion unit 222 and a communication unit 224. The communication unit 224 can receive from the sensor module 210 the information including the wavelength of the signal on the flutter of the turbine blade 300 and the transmission/reception time of the signal on the flutter of the turbine blade. The signal conversion unit 222 can convert the signal received by the communication unit 224 into a magnetic field signal. Furthermore, the communication unit 224 can transmit the converted magnetic field signal to the outside of the casing surrounding the turbine blade.

The adaptor 100 can receive the magnetic field signal to generate the power source of the system, and analyze the wavelength of the signal on the flutter of the turbine blade and the transmission/reception time of the signal on the flutter of the turbine blade by analyzing the magnetic field signal to determine the occurrence degree of the flutter of the turbine blade.

The adaptor 100 can include an antenna 110, a magnetic field reception unit 120, a power source unit 130, a magnetic field transmission unit 140, and a control unit 150.

The antenna 110 can receive the magnetic field signal transmitted from the interface 220 to deliver it to the magnetic field reception unit 120. Herein, in the magnetic field communication between the interface 220 and the adaptor 100, the interface 220 and the adaptor 100 may be set to have the same resonance frequency to transmit the maximum power. Furthermore, the distance and the location of the interface 220 and the adaptor 100 may be set to be placed at a specific distance or a specific location to transmit the maximum power.

The magnetic field reception unit 120 can receive the magnetic field signal transmitted from the interface 220 through the antenna 110, and provide the received magnet field signal to the control unit 150.

The power source unit 130 can generate the power source using the magnetic field signal provided from the control unit 150, and store the generated power source. Specifically, the power source unit 130 can include a coil that can convert the applied magnetic field into current, and a capacitor that can store the generated current. The power source unit 130 stores the current generated by the electromagnetic induction phenomenon caused by the magnetic field in the capacitor. If the current is no longer supplied to the capacitor, the power source unit 130 can use the current stored in the capacitor as the power source. Accordingly, if the magnetic field signal is supplied from the control unit 150, the power source unit 130 can store the current generated by the magnetic field signal in the capacitor, and if the current is no longer supplied to the capacitor because the magnetic field signal is not supplied from the control unit 150, the power source unit 130 can use the current stored in the capacitor as the power source.

The control unit 150 can supply the magnetic field signal receiving in the magnetic field reception unit 120 to the power source unit 130, and analyze the received magnetic field signal. Specifically, the control unit 150 can supply the magnetic field signal based upon the capacity of the power source stored in the power source unit 130. Herein, the control unit 150 can monitor the power source unit 130 to determine the capacity of the power source stored in the power source unit 130.

As one example, if the power source unit 130 is not charged, the control unit 150 can supply the magnetic field signal to the power source unit 130 until the capacity of the power source unit 130 becomes equal to or greater than a first capacity. The control unit 150 cannot analyze the magnetic field signal until the capacity of the power source unit 130 becomes equal to or greater than the first capacity. In this case, the power source unit 130 can generate the power source using the magnetic field signal supplied from the control unit 150, and store the generated power source.

For example, the first capacity can be the capacity that the charging of the power source unit 130 is completed, or even if the charging of the power source unit 130 is not completed, can be the capacity of the degree that can analyze the magnetic field signal.

As one example, if the capacity of the power source charged in the power source unit 130 is equal to or greater than the first capacity, the control unit 150 can no longer supply the magnetic field signal to the power source unit 130, and analyze the magnetic field signal to determine the degree of the flutter of the turbine blade. In this case, the control unit 150 can receive the power source from the power source unit 130 to analyze the degree of the flutter of the turbine blade.

As one example, if the power source stored in the power source unit is reduced to be equal to or smaller than a second capacity after the charging of the power source unit 130 is completed, the control unit 150 can again supply the magnetic field signal to the power source unit 130. In this case, the control unit 150 cannot use the magnetic field signal in order to analyze the degree of the flutter of the turbine blade, and control to supply all of the magnetic field signals to the power source unit 130 to generate the power source. For example, the second capacity can be the capacity that the power source stored in the power source unit 130 are all discharged, or even if the power source stored in the power source unit 130 is not all discharged, can be the capacity that is not enough analyze the magnetic field signal.

Herein, the control unit 150 can supply the magnetic field signal so that the capacity of the power source stored in the power source unit 130 is equal to or greater than the first capacity, and if the capacity of the power source stored in the power source unit 130 is equal to or greater than the first capacity, it can analyze the magnetic field signal receiving in the magnetic field reception unit 120 using the stored power source. Furthermore, if the capacity of the power source stored in the power source unit 130 is reduced to be equal to or smaller than the second capacity, the control unit 150 can again supply the magnetic field signal receiving in the magnetic field reception unit 120 to the power source unit 130. That is, the control unit 150 can measure the flutter of the turbine blade without a separate power source device.

Furthermore, the control unit 150 can analyze the magnetic field signal to determine the degree of the flutter of the turbine blade. The control unit 150 can analyze the magnetic field signal to sense the wavelength of the signal on the flutter of the turbine blade, and compare it with a pre-stored wavelength. As a result of comparing the wavelength of the signal on the flutter of the turbine blade with the pre-stored wavelength, the control unit 150 can measure the flutter of the turbine blade in the normal range within the error range. Furthermore, as a result of comparing the wavelength of the signal on the flutter of the turbine blade with the pre-stored wavelength, the control unit 150 can measure the flutter of the turbine blade in the abnormal range if the error range is exceeded.

Furthermore, the control unit 150 can analyze the magnetic field signal to compare the transmission/reception time sensed by the sensor module 210 with a pre-stored transmission/reception time. As a result of comparing the transmission/reception time sensed by the sensor module 210 with the pre-stored transmission/reception time, the control unit 150 can measure the flutter of the turbine blade in the normal range within the error range. Furthermore, as a result of comparing the transmission/reception time sensed by the sensor module 210 with the pre-stored transmission/reception time, the control unit 150 can measure the flutter of the turbine blade in the abnormal range if the error range is exceeded.

If it is determined that the flutter of the turbine blade is in the abnormal range, the control unit 150 can provide the analyzed result of the magnetic field signal to the magnetic field transmission unit 140.

The magnetic field transmission unit 140 can provide the magnetic field signal to a separate communication device. In this case, the magnetic field transmission unit 140 can use the magnetic field to transmit it to the separate communication device, and the separate communication device can be a sensor unit 200 and other devices other than the sensor unit 200.

The magnetic field communication system for measuring the flutter of the turbine blade in accordance with an embodiment of the present disclosure can adopt a communication method using the magnetic field, and thus the communication between the inside of the casing of the turbine blade and the outside thereof, which is difficult to communicate, can be made possible.

Furthermore, since the magnetic field communication system for measuring the flutter of the turbine blade in accordance with an embodiment of the present disclosure does not require a separate power source device, the communication system with the simplified configuration can be implemented. As the configuration for measuring the flutter of the turbine blade becomes simplified, the adaptor 100 that is one component of the magnetic field communication system can be provided in the region having a narrow space.

Furthermore, the magnetic field communication system for measuring the flutter of the turbine blade in accordance with an embodiment of the present disclosure can be applied to various types of turbines, such as a wind turbine, a steam turbine, a gas turbine, and a vapor turbine.

Figure 3A:
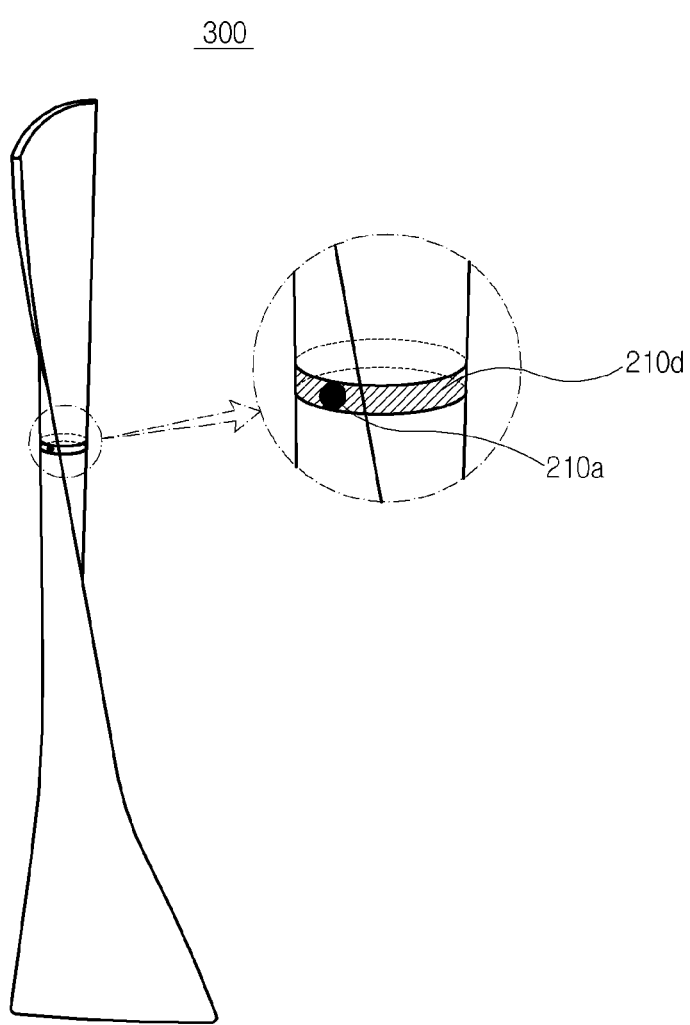
FIG. 3A is a view illustrating one example measuring the flutter of the turbine blade by placing a sensor on the turbine blade in accordance with an embodiment of the present disclosure.

FIG. 3A is a view illustrating one example measuring the flutter of the turbine blade by placing a sensor on the turbine blade in accordance with an embodiment of the present disclosure.

Referring to FIGS. 1 to 3A, the sensor module 210 placed on the turbine blade 300 can include a first sensor 210*a*. The first sensor 210*a* can be provided to the point where one end and the other end of an optical fiber 210*d* meet, and the first sensor 210*a* can transmit a signal in one direction of the optical fiber 210*d*. The optical fiber 210*d* may be in contact with the turbine blade 300 along the blade direction of the turbine blade 300, and the blade direction refers to the direction that circumferentially wraps around the outer surface of the turbine blade 300.

The signal outputted by the first sensor 210*a* can be again delivered to the first sensor 210*a* through the optical fiber 210*d*. Accordingly, the sensor module 210 can sense the wavelength of the signal on the flutter of the turbine blade 300 through the signal received by the first sensor 210*a*. Furthermore, the sensor module 210 can sense the time until the first sensor 210*a* again receives the signal transmitted by the first sensor 210*a*.

Figure 3B:
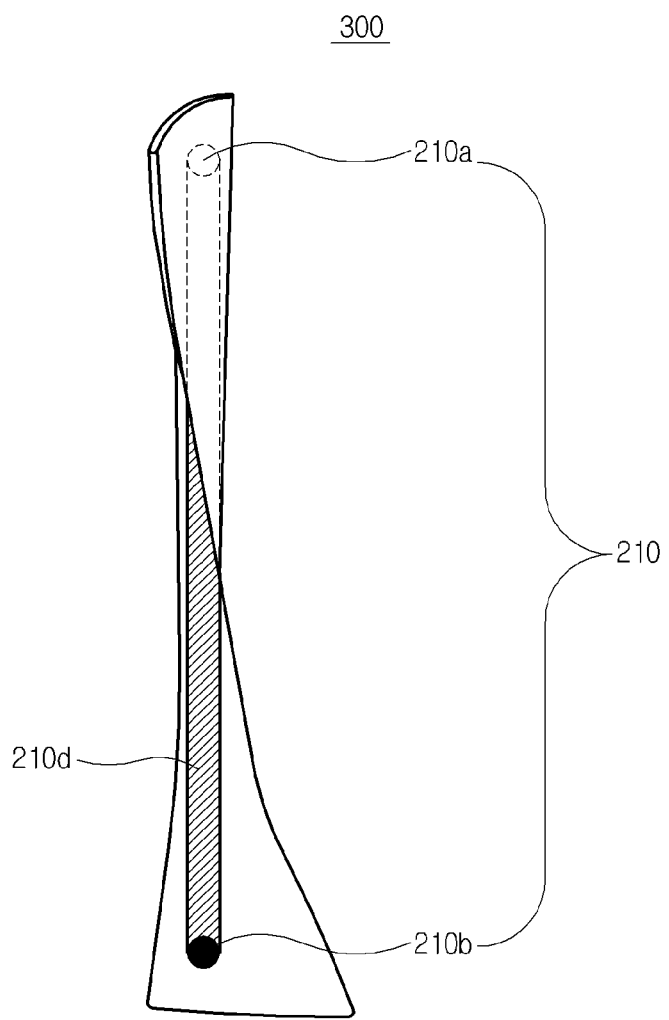
FIG. 3B is a view illustrating another example measuring the flutter of the turbine blade by placing the sensor on the turbine blade in accordance with an embodiment of the present disclosure.

FIG. 3B is a view illustrating another example measuring the flutter of the turbine blade by placing the sensor on the turbine blade in accordance with an embodiment of the present disclosure. In FIG. 3B, the same description as the control method of the control unit in FIG. 3A will be omitted for simplicity of explanation.

Referring to FIG. 3B, the sensors of the sensor module 210 placed on the turbine blade 300 are provided to one end and the other end of the optical fiber 21 (d, respectively, and the optical fiber 210*d* can be provided along the length direction thereof. The length direction refers to the direction in which the turbine blade 300 is extended not in the blade direction thereof, but in the radial direction from a turbine rotor.

The sensors of the sensor module 210 placed on the turbine blade 300 can include the first sensor 210a provided to one end of the optical fiber 210d and a second sensor 210b provided to the other end of the optical fiber 210d.

The signal transmitted by the first sensor 210a can be delivered to the second sensor 210b through the optical fiber 210d, and the second sensor 210b can sense the wavelength of the signal on the flutter of the turbine blade 300. Furthermore, the sensor module 210 can sense the time until the second sensor 210b receives the signal transmitted by the first sensor 210a.

Figure 3C:
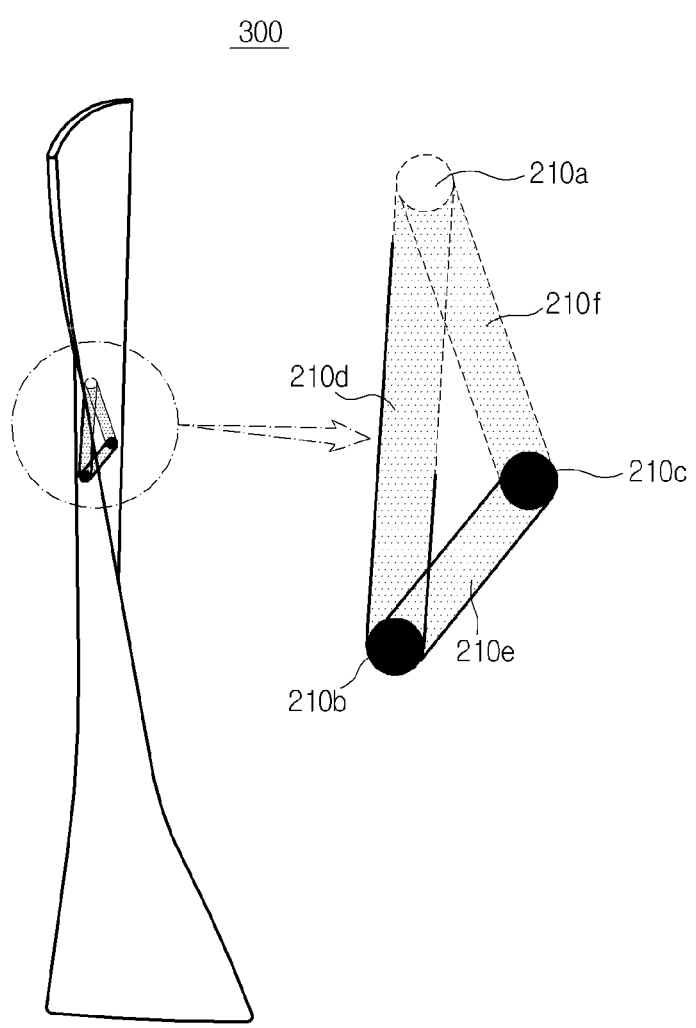
FIG. 3C is a view illustrating yet another example measuring the flutter of the turbine blade by placing the sensor on the turbine blade in accordance with an embodiment of the present disclosure.

FIG. 3C is a view illustrating yet another example measuring the flutter of the turbine blade by placing the sensor on the turbine blade in accordance with an embodiment of the present disclosure.

Referring to FIG. 3C, the sensor of the sensor module 210 placed on the turbine blade 300 can be provided in plural along the blade direction of the turbine blade 300, and the optical fiber can be provided in plural along the blade direction of the turbine blade 300.

As one example, the sensor and the optical fiber can be provided by three, respectively. The first sensor 210a can transmit the signal to the second sensor 210b, the second sensor 210b can transmit the signal to a third sensor 210c, and the third sensor 210c can transmit the signal to the first sensor 210a.

The first optical fiber 210d can connect the first sensor 210a and the second sensor 210b, a second optical fiber 210e can connect the second sensor 210b and the third sensor 210c, and a third optical fiber 210f can connect the third sensor 210c and the first sensor 210a.

The sensor module 210 can sense the wavelength of the signal on the flutter of the turbine blade 300 using the signal transmitted/received by the sensors 210a, 210b, and 210c, and the sensor module 210 can sense the transmission/reception time of the signal transmitted between the sensors 210a, 210b, and 210c to measure the flutter for each section of the outer surface of the turbine blade 300.

The sensor module 210 can provide the sensed wavelength of the signal on the flutter of the turbine blade 300 and the sensed transmission/reception time to the interface 220.

Figure 4:
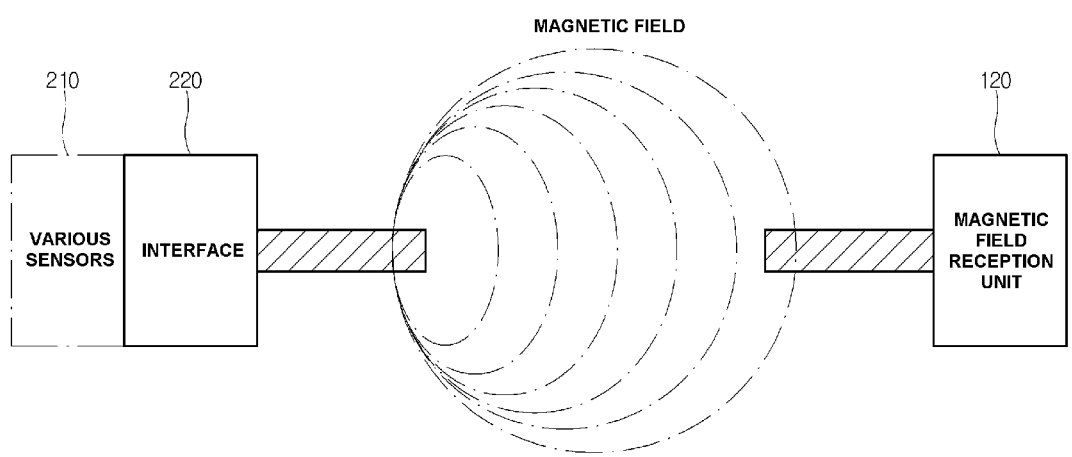
FIG. 4 is a view illustrating the magnetic field communication in accordance with an embodiment of the present disclosure.

FIG. 4 is a view illustrating the magnetic field communication in accordance with an embodiment of the present disclosure.

Referring to FIG. 4, the sensor module 210 can sense the wavelength of the signal on the flutter of the turbine blade 300 and the time transmitted/received from the sensor 210a.

The interface 220 can convert the wavelength of the signal on the flutter of the turbine blade 300 sensed in the sensor 210a and the time transmitted/received from the sensor 210a into the magnetic field signal. Furthermore, the interface 220 can transmit the converted magnetic field signal to the magnetic field reception unit 120 through the magnetic field. In this case, the interface 220 can include a separate passive element for impedance matching with the adaptor 100. Herein, the antenna 110 can receive the magnetic field signal transmitted from the interface 220 to deliver it to the magnetic field reception unit 120.

In the magnetic field communication between the interface 220 and the magnetic field reception unit 120, the interface 220 and the magnetic field reception unit 120 may be set to have the same resonance frequency, and the distance and the location between the interface 220 and the magnetic field reception unit 120 may be set to be placed at a specific distance or a specific location to transmit the maximum power. That is, it is possible to enhance the reception performance of the magnetic field communication through the impedance matching between the adaptor 100 and the sensor unit 200.

Figure 5:
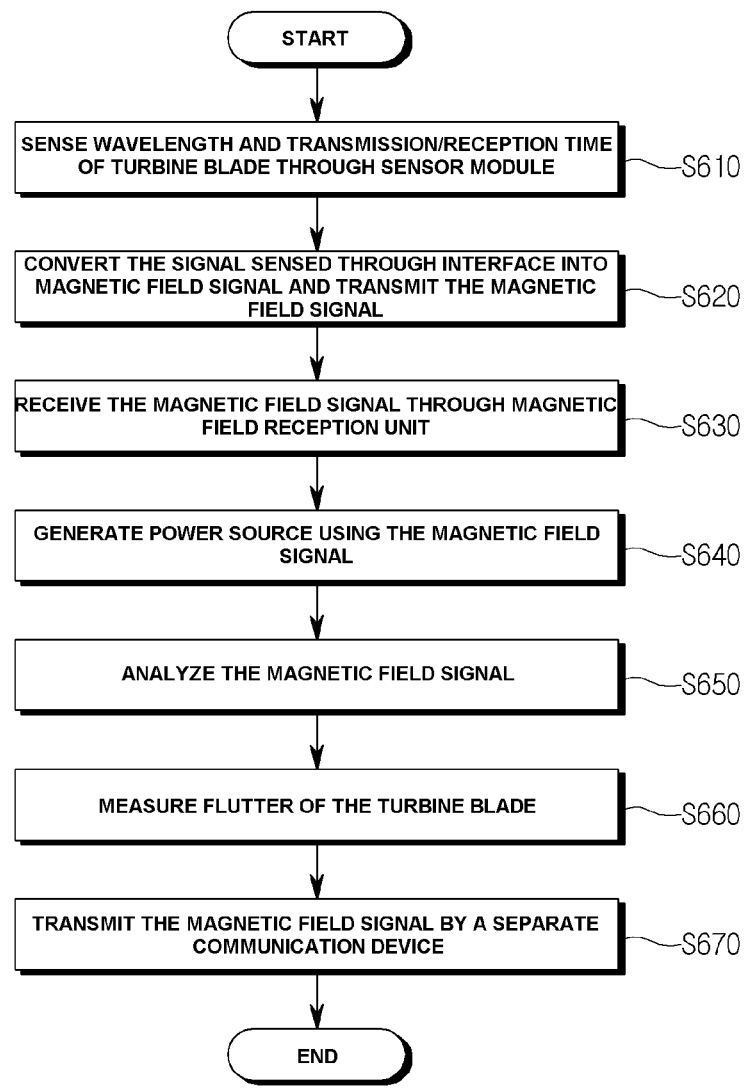
FIG. 5 is a flowchart illustrating a method of the magnetic field communication system for measuring the flutter of the turbine blade in accordance with an embodiment of the present disclosure.

FIG. 5 is a flowchart illustrating a method of the magnetic field communication system for measuring the flutter of the turbine blade in accordance with an embodiment of the present disclosure.

Referring to FIGS. 1 to 3C and 5, the sensor module 210 can be placed on the outer surface of the turbine blade 300 to sense the wavelength of the signal on the flutter of the turbine blade 300 and the time transmitted/received from the sensor S610.

Next, the interface 220 can convert the wavelength sensed in the sensor module 210 and the time transmitted/received from the sensor 210a of the sensor module 210 into the magnetic field signal, and transmit the converted magnetic field signal S620. Specifically, the signal conversion unit 222 can convert the sense signal sensed by the sensor module 210 into the magnetic field signal, and the communication unit 224 can transmit the converted magnetic field signal to the outside of the turbine blade 300.

Next, the magnetic field reception unit 120 can receive the magnetic field signal transmitted from the interface 220 S630. The magnetic field reception unit 120 can provide the received magnetic field signal to the control unit 150.

Next, the power source unit 130 can receive the magnetic field signal from the control unit 150 to generate the power source S640. If the power source unit 130 is not charged, the control unit 150 can supply the magnetic field signal to the power source unit 130. And, the power source unit 130 can generate the power source using the received magnetic field signal, and store the generated power source. Herein, the power source unit 130 can store the current generated by the electromagnetic induction phenomenon caused by the magnetic field, and the generated current can be stored in the capacitor.

Next, the control unit 150 can analyze the magnetic field signal using an electrical signal stored in the power source unit 130 as the power source S650.

If the capacity of the power source stored in the power source unit 130 is equal to or greater than the first capacity, the control unit 150 can no longer supply the magnetic field signal to the power source unit 130, and analyze the received magnetic field signal.

If the capacity of the power source stored in the power source unit 130 that is equal to or greater than the first capacity is reduced to be equal to or smaller than the second capacity, the control unit 150 can supply the magnetic field signal so that the capacity of the power source stored in the power source unit 130 is equal to or greater than the first capacity.

Next, the control unit 150 can analyze the magnetic field signal to determine the degree of the flutter of the turbine blade 300 S660.

Figure 6:
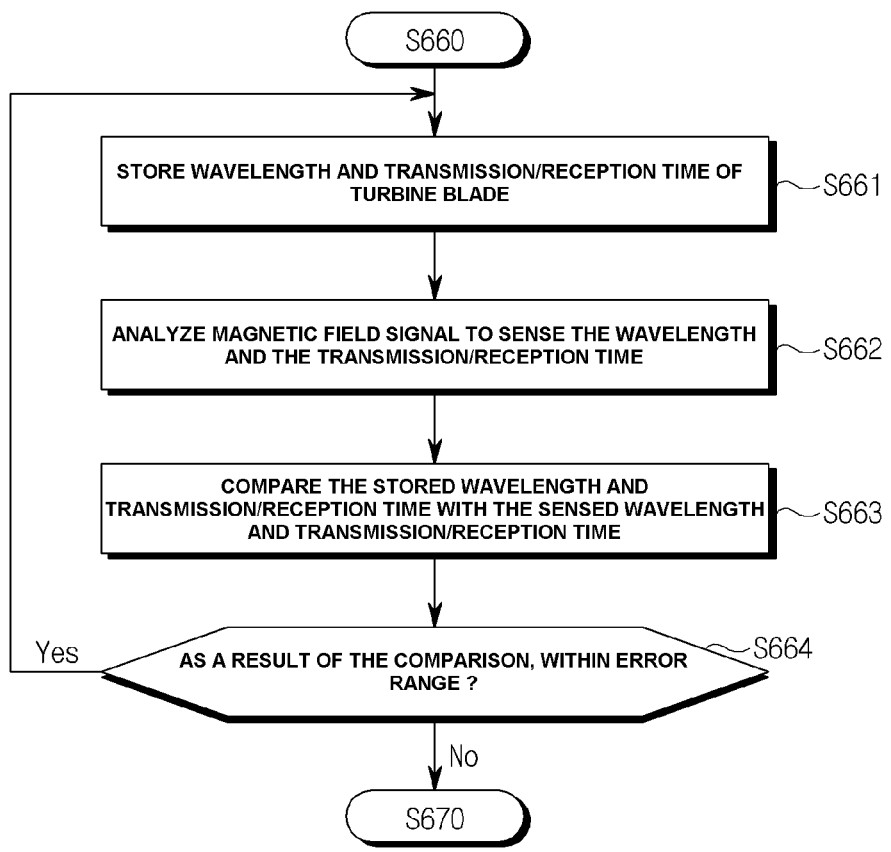
FIG. 6 is a flowchart illustrating a method of measuring the flutter of the turbine blade in accordance with an embodiment of the present disclosure.

FIG. 6 is a flowchart illustrating a method of measuring the flutter of the turbine blade in accordance with an embodiment of the present disclosure. The S660 will be described in detail with reference to FIG. 6.

Referring to FIGS. 1 to 3C and 6, the wavelength of the signal on the flutter of the turbine blade 300 and the time when the signal is transmitted/received from the sensor 210a of the sensor module 210 can be stored S661. Next, the magnetic field signal received from the interface 220 can be analyzed to sense the wavelength of the signal on the flutter of the turbine blade 300 and the time when the signal is transmitted/received from the sensor 210*a* of the sensor module 210 S662.

Next, by comparing the wavelength of the signal on the flutter of the turbine blade 300 and the time when the signal is transmitted/received from the sensor 210*a* of the sensor module 210, which are pre-stored, with the wavelength of the signal on the flutter of the turbine blade 300 and the time when the signal is transmitted/received from the sensor 210*a* of the sensor module 210, which are sensed, an error can be measured S663.

Next, in the comparing of the S663, as a result of comparing the wavelength of the signal on the flutter of the turbine blade 300 and the time transmitted/received from the sensor 210*a* of the sensor module 210, which are pre-stored, with the wavelength of the signal on the flutter of the turbine blade 300 and the time transmitted/received from the sensor 210*a* of the sensor module 210, which are sensed, the flutter of the turbine blade 300 can be measured in the normal range within an error range to perform the procedure of S660.

Meanwhile, as a result of comparing the wavelength of the signal on the flutter of the turbine blade 300 and the time transmitted/received from the sensor 210*a* of the sensor module 210, which are pre-stored, and the wavelength of the signal on the flutter of the turbine blade 300 and the time transmitted/received from the sensor 210*a* of the sensor module 210, which are sensed, it can be determined S664 that the flutter of the turbine blade 300 is in the abnormal range if an error range is exceeded, and the magnetic field signal can be transmitted to a separate communication device S670. The separate communication device can be the sensor unit 200, and can be other devices other than the sensor unit 200.

In accordance with an embodiment of the present disclosure, it is possible to measure the flutter of the turbine blade that is difficult to sense to sense damage of the turbine in advance, thus reducing the severe damage of the turbine. Furthermore, the magnetic field communication system in accordance with an embodiment of the present disclosure can transmit/receive the magnetic field to voluntarily generate the power source, thus measuring the flutter of the turbine blade without replacing the battery of the sensor module, and simplifying the configuration of the communication system because a separate battery is not required.

Those skilled in the art to which the present disclosure pertains should be understood that the present disclosure may be implemented in other various forms without departing from the technical spirit or essential characteristics of the present disclosure, so the aforementioned embodiments should not be construed as being limitative, but should be construed as being only illustrative from all aspects. The scope of the present disclosure is disclosed in the appended claims rather than the detailed description, and it should be understood that all modifications or variations derived from the meanings and scope of the present disclosure and equivalents thereof are included in the scope of the appended claims.

What is claimed is:

1. A magnetic field communication system for measuring a state of a turbine blade, comprising:
    a sensor module placed on the turbine blade to sense a signal on the state of the turbine blade;
    an interface converting the signal on the state sensed by the sensor module into a magnetic field signal to transmit it to a casing surrounding the turbine blade;
    an adaptor receiving the magnetic field signal and analyzing the magnetic field signal to determine the state of the turbine blade, wherein the adaptor comprises a magnetic field reception unit receiving the magnetic field signal and a control unit analyzing the magnetic field signal;
    a power source unit generating a power source using the magnetic field signal and storing the power source, wherein if the capacity of the power source charged in the power source unit is equal to or greater than a first capacity, the control unit uses the magnetic field signal to sense the signal, the first capacity being the capacity that the charging of the power source unit is completed; and
    wherein if the capacity of the power source charged in the power source unit is equal to or smaller than a second capacity, the control unit uses the magnetic field signal to supply it to the power source unit to generate the power source.

2. The magnetic field communication system for measuring the state of the turbine blade of claim 1,
    wherein the sensor module comprises:
    an optical fiber placed on the outer surface of the turbine blade; and
    at least one sensor connected with the optical fiber.

3. The magnetic field communication system for measuring the state of the turbine blade of claim 2,
    wherein the optical fiber contacts along the blade direction of the turbine blade,
    wherein the sensor is provided to the point where one end and the other end of the optical fiber meet, and
    wherein the sensor senses the change of the wavelength of a signal and the time when the signal transmitted from the sensor again reaches the sensor by the optical fiber by transmitting the signal in one direction of the optical fiber and receiving the transmitted signal.

4. The magnetic field communication system for measuring the state of the turbine blade of claim 3,
    wherein the sensor is provided in plural along the blade direction of the turbine blade, and the sensors measure the state for each section of the outer surface of the turbine blade.

5. The magnetic field communication system for measuring the state of the turbine blade of claim 2,
    wherein the optical fiber is provided along the length direction in which the turbine blade is extended from a turbine rotor, and
    wherein the sensor is provided in plural to one end and the other end of the optical fiber, respectively.

6. The magnetic field communication system for measuring the state of the turbine blade of claim 5,
    wherein the sensors comprise a first sensor provided to one end of the optical fiber, and a second sensor provided to the other end of the optical fiber, and
    wherein the second sensor receives the signal transmitted by the first sensor to measure the change of the wavelength of the signal and the reach time of the signal.

7. The magnetic field communication system for measuring the state of the turbine blade of claim 1,
    wherein the interface is placed on the outer surface of the turbine blade.

8. The magnetic field communication system for measuring the state of the turbine blade of claim 1,
    wherein if the capacity of the power source stored in the power source unit after the charging of the power source unit is completed is reduced to be equal to or smaller than a second capacity, the control unit uses the received magnetic field signal to charge the power source unit.

9. The magnetic field communication system for measuring the state of the turbine blade of claim 1,
   wherein the control unit analyzes the wavelength of the signal on the state measured by the sensor module by analyzing the magnetic field signal to compare it with a pre-stored wavelength.

10. The magnetic field communication system for measuring the state of the turbine blade of claim 9, wherein the control unit
   as a result of comparing the wavelength of the signal on the state with the pre-stored wavelength, determines a flutter of the turbine blade in the normal range within an error range, and
   as a result of comparing the wavelength of the signal on the flutter with the pre-stored wavelength, determines the flutter of the turbine blade in the abnormal range if the error range is exceeded.

11. The magnetic field communication system for measuring the state of the turbine blade of claim 1,
   wherein the control unit analyzes the transmission/reception time of the signal on the state measured by the sensor module by analyzing the magnetic field signal to compare it with a pre-stored transmission/reception time.

12. The magnetic field communication system for measuring the state of the turbine blade of claim 11, wherein the control unit
   as a result of comparing the transmission/reception time of the signal on the state with the pre-stored transmission/reception time, determines a flutter of the turbine blade in the normal range within an error range, and
   as a result of comparing the transmission/reception time of the signal on the flutter with the pre-stored transmission/reception time, determines the flutter of the turbine blade in the abnormal range if the error range is exceeded.

* * * * *